United States Patent Office 2,715,633
Patented Aug. 16, 1955

2,715,633

2-DISUBSTITUTEDAMINO-5,5-DIPHENYL-4(5)-IMIDAZOLONE COMPOUNDS

Cornelius K. Cain, Flourtown, Pa.

No Drawing. Application August 18, 1953,
Serial No. 375,065

7 Claims. (Cl. 260—309.6)

The present invention relates to novel chemical compounds and to the method of preparing the same; and, more particularly, it relates to 2-disubstitutedamino-5,5-diphenyl-4(5)-imidazolone compounds possessing therapeutic properties.

It is the principal object of the present invention to provide novel chemical compounds which possess therapeutic properties and which, in particular, exhibit stimulant activity when administered to a living body.

Other objects including the provision of a method of preparing the compounds will become apparent from a consideration of the following specification and claims.

The novel compounds of the present invention are the 2-disubstitutedamino-5,5-diphenyl-4(5)-imidazolone compounds comprising the fundamental structural formula:

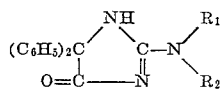

where $R_1$ and $R_2$ are selected from the group consisting of methyl, ethyl, hydroxyethyl, phenyl and benzyl.

In any particular compound $R_1$ and $R_2$ may be the same or different, and preferably they are the same. In the preferred compounds of the invention $R_1$ and $R_2$ are both alkyl groups, particularly ethyl groups.

In the compounds of the invention a mol equivalent of an acid may be added to provide the compound in the form of an addition salt. Hence, the compounds may be prepared and/or employed either as the base or as a salt. In view of the fact that structurally the salts differ from the bases only in the addition of the acid to the molecule and comprise the same fundamental structural formula, the salts as well as the bases are included within the scope of this application and of the claims where reference is made to compounds comprising the stated fundamental structure.

The acid forming the salt may be any inorganic or organic acid desired, for example, hydrochloric, hydrobromic, hydriodic, nitric, sulphuric, phosphoric, and the like; acetic, propionic, caproic, stearic, and other acids of this series, and the like; crotonic, fumaric, oleic, oxalic, citric, tartaric, lactic, benzoic, naphthoic, picric, salicyclic, dilituric, methane sulphonic, camphor sulphonic, and the like. If a salt is to be administered, any toxicity or other undesirable effects which may be imparted by the acid should be taken into consideration as well known in the art.

The compounds are readily prepared by reacting a 2-alkylmercapto-5,5-diphenyl-4(5)-imidazolone.

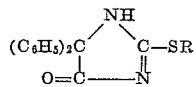

where R is an alkyl group, preferably methyl, with a molecular equivalent of an appropriate secondary amine $NHR_1R_2$, where $R_1$ and $R_2$ are as defined above. Insofar as the reaction is concerned it is prefered to employ the amine in excess of that stoichiometrically required, and especially when the amine is high boiling, it may be sufficiently in excess to serve as the solvent reaction medium. Other liquids may be employed as solvent, such as ethylene glycol, especially when a high boiling amine is employed, and isopropyl alcohol, particularly when a low boiling amine is used.

The reaction is carried out at an elevated temperature, generally between about 100 and about 200° C. When the amine reactant boils at a temperature below the desired reaction temperature a sealed vessel may be employed. When a high boiling amine is the reactant amine the reaction is preferably conducted under refluxing conditions.

After the reaction is completed the mixture is cooled, causing the product to separate as a solid. The solid product may then be separated as by filtration and then purified following well known techniques, such as washing with acetone, ether or ligroin and recrystallization.

When the product is to be prepared in the form of a salt, the product prepared as described above, either before or after purification, is treated in solution with the desired acid. The resulting product is then collected and purified.

The compounds of the present invention and their preparation are further illustrated by the following specific examples which are given for the purpose of illustration only and are not to be construed as limiting the scope of the invention:

Example I

A mixture of 5 g. 2-methylmercapto-5,5-diphenyl-4(5)-imidazolone, 10 cc. of diethylamine and 50 cc. of isopropyl alcohol was sealed in a glass bomb and heated at 170–180° C. for twelve hours. After cooling, the contents of the bomb consisted of white crystals and a yellowish mother liquor. The crystals were filtered off and washed with acetone. The filtrate and washings were evaporated to dryness and washed with cold acetone. All solid material was crystallized from methanol. The product 2-diethylamino-5,5-diphenyl-4(5)-imidazolone, melted at 277–278° C. The calculated analysis for $C_{19}H_{21}N_3O$ is C, 74.3%; H, 6.8%; N, 13.7%; that found was C, 74.3%; H, 6.5%; N, 13.7%.

Example II

A mixture of 5 g. of 2-methylmercapto-5,5-diphenyl-4(5)-imidazolone, 5 g. of dimethyamine and 50 cc. isopropyl alcohol was heated at 168–174° C. for 10 hours in a sealed tube. Upon cooling the resulting mixture, a white crystalline material separated which was removed and recrystallized from methanol. The product 2-dimethylamino-5,5-diphenyl-4(5)-imidazolone, melted at 356–357° C. The calculated N content for $C_{17}H_{17}N_3O$ is 15.05%; that found was 15.25±0.08%.

Example III

A mixture of 10 g. of 2-methylmercapto-5,5-diphenyl-4(5)-imidazolone, 10 g. of N-ethyl-ethanolamine and 75 ml. of ethylene glycol was heated under reflux at 145–150° C. for one hour. The white crystalline solid which separated on cooling was collected next day and recrystallized from methanol. The product, 2-[N-ethyl-N-(2-hydroxyethyl)amino]-5,5-diphenyl-4(5)-imidazolone, melted at 251–252° C. The calculated N content for $C_{19}H_{21}N_3O_2$ is 13.0%; that found was 13.0%.

Example IV

A mixture of 2.4 g. of 2-methylmercapto-5,5-diphenyl-4(5)-imidazolone and 5 g. of dibenzylamine was heated at 180–185° C. for 40 hours until the evolution of methyl mercaptan ceased. On cooling, crystalline material separated which was washed twice with ligroin. The crystals were then dissolved in 50 cc. methylene chloride and extracted three times with 1N NaOH. The methylene chloride was then evaporated and the residue recrystallized first from acetone and then from a methanol-water mixture. The product, 2-dibenzylamino - 5,5 - diphenyl-4(5)-imidazolone, melted at 233-235° C. The calculated N content for $C_{29}H_{25}N_3O$ is 9.8%; that found was 10.0%.

*Example V*

A mixture of 2 - methylmercapto - 5,5 - diphenyl-4(5)-imidazolone and an excess of diphenylamine was heated in ethylene glycol at 140° C. for 9 hours. Upon cooling, the solid product was separated and recrystallized three times from aqueous acetone. The product, 2-diphenylamino-5,5-diphenyl-4(5)-imidazolone, melted at 295.5–296° C. The calculated N content for $C_{27}H_{21}N_3O$ is 10.4%; that found was 10.8%.

*Example VI*

5 g. of 2-methylmercapto-5,5-diphenyl-4(5)-imidazolone was heated in about five-fold excess of methylaniline at 135–140° C. in an atmosphere of nitrogen for 29 hours. After two recrystallizations from aqueous acetone, the product 2 -(methylanilino) - 5,5-diphenyl-4(5)-imidazolone, melted at 306.5° C. The calculated N content for $C_{22}H_{19}N_3O$ is 12.3%; that found is 12.1%.

Some modification is possible in the selection of the various substituents as well as in the particular technique employed in preparing the compounds without departing from the scope of the present invention.

I claim:

1. 2-Disubstitutedamino-5,5-diphenyl-4(5)-imidazolone compounds comprising the fundamental structural formula:

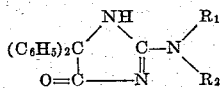

where $R_1$ and $R_2$ are selected from the group consisting of methyl, ethyl, hydroxyethyl, phenyl and benzyl.

2. 2 - Disubstitutedamino - 5,5 - diphenyl - 4(5) - imidazolone compounds comprising the fundamental structural formula:

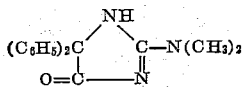

3. 2 - Disubstitutedamino - 5,5 - diphenyl - 4(5) - imidazolone compounds comprising the fundamental structural formula:

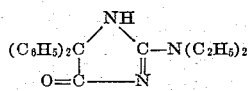

4. 2 - Disubstitutedamino - 5,5 - diphenyl - 4(5) - imidazolone compounds comprising the fundamental structural formula:

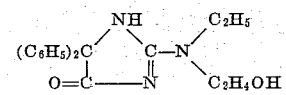

5. 2 - Disubstitutedamino - 5,5 - diphenyl - 4(5) - imidazolone compounds comprising the fundamental structural formula:

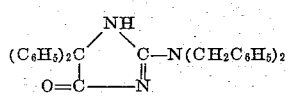

6. 2 - Disubstitutedamino - 5,5 - diphenyl - 4(5) - imidazolone compounds comprising the fundamental structural formula:

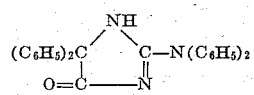

7. 2 - Disubstitutedamino - 5,5 - diphenyl - 4(5) - imidazolone compounds comprising the fundamental structural formula:

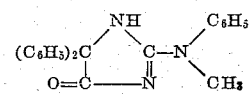

References Cited in the file of this patent

Hoffman, Chem. Abstracts, vol. 44, col. 6819 (1950).
Carrington et al., Chem. Abstracts, vol. 44, cols. 7776-8 (1950).